United States Patent [19]
Foster

[11] 3,858,201
[45] Dec. 31, 1974

[54] HIGH ANGULAR RESOLUTION SENSOR
[75] Inventor: Leigh Curtis Foster, Atherton, Calif.
[73] Assignee: Itek Corporation, Lexington, Mass.
[22] Filed: Oct. 15, 1973
[21] Appl. No.: 406,716

[52] U.S. Cl. ............. 340/347 P, 356/141, 356/152
[51] Int. Cl. ...................... H03k 13/18, G08c 9/06
[58] Field of Search ......... 340/347 P, 102; 356/141, 356/152, 138, 147, 153

[56] References Cited
UNITED STATES PATENTS
| | | | |
|---|---|---|---|
| 3,544,800 | 12/1970 | Elliott | 250/231 |
| 3,662,180 | 5/1972 | Jorgensen et al. | 250/199 |
| 3,706,493 | 12/1972 | Redmann | 356/4 |

OTHER PUBLICATIONS
Harrison, "Two-Axis Automatic Digital Auto Collimator," IBM Tech. Disc. Bulletin, Vol. 12, No. 10, March 1970.

Primary Examiner—Malcolm A. Morrison
Assistant Examiner—Vincent J. Sunderdick
Attorney, Agent, or Firm—Homer O. Blair; Robert L. Nathans; William C. Roch

[57] ABSTRACT

A system for determining the direction from which an illuminating laser beam is received. A cylindrical optical system focuses a laser beam from the field of view as a sharp line image at its focal plane. An encoder plate having a plurality of encoder tracks of differing resolution is located at the focal plane with the tracks positioned perpendicular to the line image. An array of radiation detectors nonfocused radiation passed by the plurality of tracks. The output of the array is a digital word representing the position of the line image on the encoder plate which in turn defines the position of the laser source in the field of view.

9 Claims, 3 Drawing Figures

HIGH ANGULAR RESOLUTION SENSOR

BACKGROUND OF THE INVENTION

The present invention relates generally to military applications wherein it is possible that the enemy may illuminate you with a laser beam. Weapon systems using laser sources have been successfully demonstrated, and include lasers used for range finders, target designators and illuminators, tracking systems, night vision augmentation sources, and laser guided bombs, missiles, and artillery shells. Appropriate systems must be developed to provide defense against these active laser systems. Such defensive systems should provide a warning that you are being illuminated, extract pertinent characteristics of the illuminating signal, analyze the signal, and present threat data on the illuminating signal. This threat data should include characteristics of the illuminating laser beam such as pulse width, wavelength, pulse repetition rate, amplitude, and information on the direction from which the illuminating laser beam is received. Further, the system must be compatible with space, size, weight and environmental limitations imposed by tactical vehicles.

In particular, the present invention relates to a system for determining the direction from which an illuminating laser beam is received.

SUMMARY OF THE INVENTION

In accordance with a preferred embodiment, a system is disclosed for determining the direction from which an illuminating laser beam is received. Further, the preferred embodiment provides such a system wherein a cylindrical optical system gathers radiation from over a relatively wide field of view and focuses the radiation as a sharp line image at its focal plane. A sharp line image is important as it allows an accurate determination of the line image position. An encoder means is positioned at the focal plane and includes a plurality of code tracks of differing resolution which are positioned to run in a direction substantially perpendicular to the direction of the line image. The code tracks selectively pass radiation in dependence upon the position of the line image, and the passed radiation is detected as nonfocused radiation by a plurality of detectors. The detection of nonfocused radiation is an important feature of this invention because if the detector array were located directly at the focal plane focused background sun light might burn holes in or otherwise damage the detector array. Also, because the encoder means is positioned at the focal plane, a nonuniform input aperture, as might be caused by dirt, etc., does not cause a first-order error in the angle measurement. The outputs of said plurality of detectors are representative of the position of the line image relative to the encoder means which in turn defines the direction from which the incident radiation is received. Further, the preferred embodiment provides such a system wherein the plurality of code tracks form a Gray code, and further wherein each of said plurality of code tracks have alternating radiation opaque and radiation transmissive areas. Also, the preferred embodiment provides such a system wherein each of the detectors includes a linear detector extending along the entire length of the code track from which it is to detect radiation. Further, the preferred embodiment provides such a system which is to be utilized in a military environment for determining the direction from which laser energy is received.

Also, the preferred embodiment provides such a system wherein a low quality optical system may be utilized. The system compensates for significant aberrations in the line image produced by the low quality optical system by constructing the encoder plate to compensate for those aberrations. The compensated encoder plate is produced by utilizing the low quality optical system to image a set of uniformly accurate code tracks onto the encoder plate. The imaged code tracks will assume a deformed shape in accordance with the aberrations introduced by the low quality optical system. When the compensated encoder plate is utilized in the system, aberrations in the line image do not produce errors in the output signal as the encoder plate has the same aberrations and thus compensates for aberrations in the line image.

DESCRIPTION OF A PREFERRED EMBODIMENT

Figure 1:
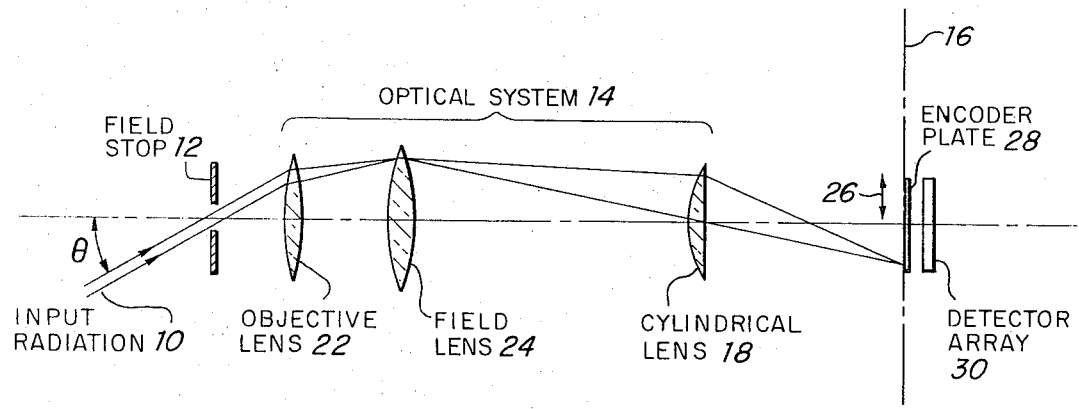
FIG. 1 illustrates a side view of a preferred embodiment of this invention for detecting the direction of incident radiation received from over a relatively wide field of view.

Referring to FIG. 1, there is illustrated a side view of a preferred embodiment for detecting the direction of incident laser radiation received from over a relatively wide field of view. Laser radiation 10, received at an angle $\theta$, enters the system through a field stop 12, and is focused by optical system 14 at focal plane 16. The lens system 14, illustrated schematically in FIG. 1, includes a cylindrical lens 18 such that the illuminating beam 10 is focused at the focal plane as a line image 20, shown in FIG. 2. The optical system of the preferred embodiment also includes an objective lens 22 and a field lens 24. The position of the line image along direction 26 is a direct function of the angle $\theta$ at which the laser beam is received. As angle $\theta$ decreases the line image will move in an upward direction as viewed in FIG. 1.

An encoder plate 28, located at the focal plane 16, and a detector array 30 are utilized to detect the exact position of the line image at the focal plane.

The encoder plate 28 consists of a number of encoder tracks of differing resolution with each track having alternating radiation opaque and radiation transmissive areas. The encoder plate 28 might take any one of several forms. For instance, it may be an aperture card wherein the radiation transmissive areas are punched out to form apertures. Alternatively, it might be a photographically developed plate. Further, if the optical system 14 is not a high quality optical system and introduces significant aberrations into the line image, then the encoder plate may be constructed to compensate for those aberrations. Such a compensated encoder plate might be produced easily by utilizing the low quality lens system to image encoder tracks onto the encoder plate. With such a technique, the lens system may be utilized to automatically compensate for its own deficiencies.

Radiation passing through radiation transmissive areas in the encoder plate is detected by an array of photodetectors. FIG. 3 illustrates the array as an array of linear photodetectors, each of which extends the length of an encoder track. In alternative embodiments, the linear detectors might be replaced by other detection systems. For instance, the radiation from each encoder track might be coupled by a light pipe back to a small area detector. Each photodetector produces a 1 or a 0 output depending upon whether the line image is located on a radiation transmissive area or a radiation opaque area. For the line image location illustrated in FIG. 2, the output of the detector array would be the digital word 1,0,0,1. A digital output from the system is desirable as it interfaces readily with digital electronics for display of the angle $\theta$ in a manner as is well known in the art.

The resolution of the system is determined by the number of encoder tracks utilized in the system. If there are $n$ encoder tracks and corresponding detectors, then the resolution with which the angle $\theta$ may be determined is the total field of view divided by $2^n$. Better than 1° accuracy can be obtained with a field of view of 60° and six tracks, or with a field of view of 90° and seven tracks.

The system described thus far gives angular information about one axis which is perpendicular to the plane as shown in FIG. 1. The output of the system is virtually independent of the angle of arrival of the radiation relative to a second axis perpendicular to the first axis. To give complete positional information in both azimuth and elevation, two systems as illustrated in FIG. 1 would have to be utilized, one for azimuth and one for elevation.

The construction of the preferred embodiment has several advantageous features which should be noted. The detector array detects nonfocused radiation. If the detector array were located directly at the focal plane, a problem might arise from background sunlight as such focused sunlight might easily burn holes in the detector array. Also because the encoder plate is positioned at the focal plane of the optical system, a nonuniform input aperture, as might be caused by dirt etc., does not cause a first order error in the angle measurement.

Figure 2:
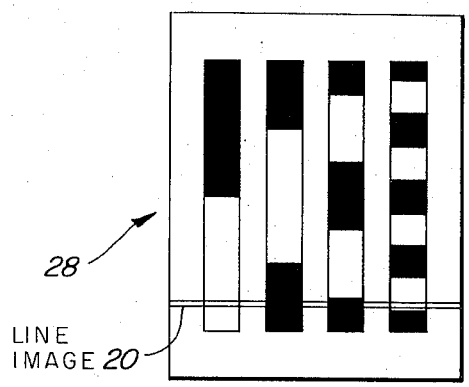
FIG. 2 shows the encoder plate utilized in the embodiment of FIG. 1.
Figure 3:
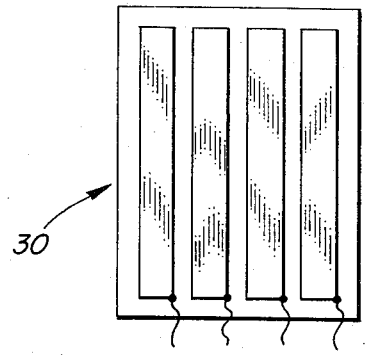
FIG. 3 illustrates the detector array utilized in the embodiment of FIG. 1.

The encoder plate 18 illustrated in FIG. 2 has a Gray code thereon. In alternative embodiments other types of codes, such as a binary code, might be utilized. Also, the embodiment illustrated in FIG. 1 illustrates an encoder plate having tracks formed of radiation transmissive and radiation opaque increments. In alternative embodiments, the encoder plate might have tracks of radiation reflective and radiation nonreflective increments. In such embodiments, the array of detectors would be positioned to detect radiation reflected by the encoder plate.

While several embodiments have been described, the teachings of this invention will suggest many other embodiments to those skilled in the art.

I claim:

1. A system for detecting the direction from which incident radiation is received from over a given field of view, and comprising:
   a. a cylindrical optical system for gathering radiation from the relatively wide field of view and for directing the radiation back to a focal plane as a sharp line image with the position of the line image in said focal plane being dependent upon the direction from which the radiation is received;
   b. encoder means positioned substantially at said focal plane, said encoder means having a plurality of code tracks for selectively passing radiation in dependence upon the position of said line image relative to said code tracks;
   c. a plurality of detectors, at least one for each said code track, for detecting nonfocused radiation selectively passed by said code tracks, whereby said plurality of detectors will not be damaged by focused radiation and whereby the outputs of said plurality of detectors are representative of the position of said line image relative to said encoder means which in turn defines the direction from which the incident radiation is received.

2. A system as set forth in claim 1 wherein said plurality of code tracks form a Gray code.

3. A system as set forth in claim 1 wherein each of said plurality of detectors includes a linear detector extending the entire length of the code track from which it is to detect radiation.

4. A system as set forth in claim 1 wherein each of said plurality of code tracks have alternating radiation opaque and radiation transmissive areas.

5. A system as set forth in claim 1 wherein:
   a. said cylindrical optical system and introduces particular aberrations into said line image; and
   b. said encoder means includes a compensated encoder means constructed to compensate for said particular aberrations in said line image.

6. A system as set forth in claim 5 wherein said compensated encoder means is constructed with said cylindrical optical system which is utilized to form an image of an uncompensated encoder means having a plurality of uniformly accurate code tracks onto said compensated encoder means, whereby said cylindrical optical system will form an image on said compensated encoder means having particular aberrations which are characteristic of said cylindrical optical system.

7. A system as set forth in claim 6 wherein said plurality of code tracks form a Gray code.

8. A system as set forth in claim 7 wherein each of said plurality of code tracks have alternating radiation opaque and radiation transmissive areas.

9. A system as set forth in claim 8 wherein each of said plurality of detectors includes a linear detector extending the length of the code track from which it is to detect radiation.

* * * * *